United States Patent
Monnier

(10) Patent No.: US 6,267,104 B1
(45) Date of Patent: Jul. 31, 2001

(54) SYSTEM INTENDED FOR PRESSURE SUPPLY OF LIQUID FUEL TO AN INTERNAL-COMBUSTION ENGINE

(75) Inventor: Gaëtan Monnier, rue Paul Cézanne (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/528,178

(22) Filed: Mar. 17, 2000

(30) Foreign Application Priority Data

Mar. 18, 1999 (FR) ................................. 99 03632

(51) Int. Cl.[7] ..................................... F02M 37/04
(52) U.S. Cl. .................... 123/516; 123/179.17; 123/527
(58) Field of Search ............... 123/179.17, 516, 123/519, 520, 521, 456, 527

(56) References Cited

U.S. PATENT DOCUMENTS

| | | |
|---|---|---|
| 5,033,444 | 7/1991 | Kaufman . |
| 5,074,272 * | 12/1991 | Bostick et al. ................. 123/514 |
| 5,327,872 * | 7/1994 | Morikawa ..................... 123/516 |
| 5,373,829 * | 12/1994 | Schuers et al. ................. 123/510 |
| 5,471,962 * | 12/1995 | Nakashima et al. ............. 123/456 |
| 5,558,068 * | 9/1996 | Kunishima et al. ............. 123/516 |
| 5,598,817 * | 2/1997 | Igarashi et al. ............... 123/179.17 |
| 5,758,622 * | 6/1998 | Rembold et al. ............... 123/456 |
| 5,775,281 | 7/1998 | Smith . |
| 5,970,957 * | 10/1999 | Fried et al. .................. 123/516 |
| 6,021,763 * | 2/2000 | Yoshihara et al. ............... 123/516 |

FOREIGN PATENT DOCUMENTS

| | | | |
|---|---|---|---|
| 0200663 * | 12/1982 | (JP) | ....................... 123/516 |
| 0048768 * | 3/1983 | (JP) | ....................... 123/516 |
| 9208888 | 5/1992 | (WO) . | |
| 9635863 | 11/1996 | (WO) . | |

* cited by examiner

Primary Examiner—Carl S. Miller
(74) Attorney, Agent, or Firm—Antonelii, Terry, Stout & Kraus, LLP

(57) ABSTRACT

A system intended for pressure supply of liquid fuel to at least one combustion chamber of an internal-combustion engine, includes a tank (1) intended for pressure storage of the liquid fuel, injectors (2) for pressure injection of the fuel into at least one combustion chamber, a line (3) between the tank (1) and the (pressure) injectors (2), a pump (4) placed in the tank (1) or on the line (3), a pressure regulator (5) placed in the tank (1) or on the line (3), and a capacity (canister) (6) placed on a by-pass (7) of the line (3) towards an intake system (A) of the engine and intended for gaseous fuel storage. The fuel injection is performed directly or not into the combustion chamber(s), and a solenoid value (8) for isolating the injectors (2) in relation to the tank (1) and are provided a drain (9) for draining the injectors (2), placed on the by-pass (7), upstream from the capacity (6).

14 Claims, 1 Drawing Sheet

SYSTEM INTENDED FOR PRESSURE SUPPLY OF LIQUID FUEL TO AN INTERNAL-COMBUSTION ENGINE

FIELD OF THE INVENTION

The present invention relates to the field of engines with direct or indirect injection of liquid fuel into at least one combustion chamber.

The fuel can be liquefied petroleum or liquefied natural gas, dimethylether (DME), ethylal, methylal or diethylether (DEE).

BACKGROUND OF THE INVENTION

It is well-known to use these fuels in admixture with the intake air. Patent application WO 96/35,863 describes a system based on this concept where air and liquefied fuel are mixed upstream from the combustion chambers as a complement to a conventional gasoline injection system (of "common rail" type here). However, fuel vaporization problems are observed with this type of supply. To overcome this problem, this prior art proposes mixing the liquid fuel with the intake air in a place relatively distant from the combustion chamber; the temperatures are thus less high and better vaporization can be performed.

Recent developments have allowed to introduce the fuel in liquid form, directly or mixed with air, into the combustion chamber. This requires pressure maintenance in all the supply system, from the tank to the vaporization point: combustion chamber in the case of direct injection or intake pipes for indirect injection.

An important problem then consists in maintaining and controlling the liquid state by means of the pressure in all of the supply system, whatever the running conditions of the engine and the outside conditions. In fact, the liquefaction pressure variation can range from 1 to 18 bars according to the working temperature of the fuel.

The fuel tank is generally designed to withstand this type of pressures so that storage in the liquid state does not pose problems at this level of the supply circuit.

However, this is not the case in the other parts of the supply circuit and notably between the tank and the injectors.

More precisely, a problem arises when the engine is restarted after prolonged stoppage of the engine.

This phenomenon can be explained as follows: the injectors being permeable to the fluid, a slight liquid leak occurs when the engine is stopped, which lowers the pressure in the supply system and therefore changes the state of the fuel that goes from the liquid to the gaseous state. The leak is thus sustained.

After a more or less long period of immobilization of the vehicle, which depends on the storage conditions and on the structure of the injectors, the (originally liquid) fuel contained in the supply system can thus be vaporized and transferred to the engine, either directly into the combustion chamber or via the intake.

When the engine is restarted, the vaporized fuel is present in large amounts in the combustion chamber, which generates a non-flammable mixture (case of liquefied petroleum gas LPG) or self-ignition (case of dimethylether DME).

A known solution consists in isolating each injector of the rail by a solenoid valve when the vehicle is stopped. However, this solution is complex, bulky and expensive.

SUMMARY OF THE INVENTION

In order to solve the problems linked with bad pressure maintenance in the supply system of such engines, the present invention proposes an innovative solution, both simple and reliable.

It consists, when the engine is stopped, to isolate the part of the supply system comprising the injectors by any suitable means. The liquid fuel contained in the part thus isolated can then be drained into a suitable storage system (liquid or gaseous).

This concept thus prevents any liquid fuel leak into the engine and therefore allows good starting of the engine after a certain stoppage.

The object of the present invention thus is a system intended for pressure supply of liquid fuel to at least one combustion chamber of an internal-combustion engine, comprising a tank intended for pressure storage of the liquid fuel, means allowing pressure injection of the fuel into at least one combustion chamber, a line between said tank and said injection means, a pump placed in the tank or on said line, a pressure regulator placed in said tank or on said line, a capacity (canister) placed on a by-pass of the line towards an intake system (A) of the engine and intended for storage of the gaseous fuel, fuel injection being performed directly or not into the combustion chamber(s).

According to the invention, the system further comprises a means for isolating the injection means in relation to the tank and means for draining the injection means, placed on said by-pass, upstream from said capacity.

According to an embodiment of the invention, the injection means consists of at least one rail comprising each several injectors.

According to a particular embodiment of the invention, the system further comprises a return line between the injection means and the tank.

More precisely, the isolation means can consist of at least two solenoid valves placed respectively on the line and on the return line, on either side of the injection means.

Without departing from the scope of the invention, the isolation means can consist of a solenoid valve placed on the line between the tank and the by-pass.

In accordance with the invention, the system further comprises means for controlling the isolation means according to the engine stoppage time and conditions, such as the pressure and/or the surrounding temperature.

BRIEF DESCRIPTION OF THE DRAWINGS

Other features, details and advantages of the invention will be clear from reading the description hereafter, given by way of non limitative examples, with reference to the accompanying drawings wherein.

DETAILED DESCRIPTION OF THE INVENTION

Figure 1:
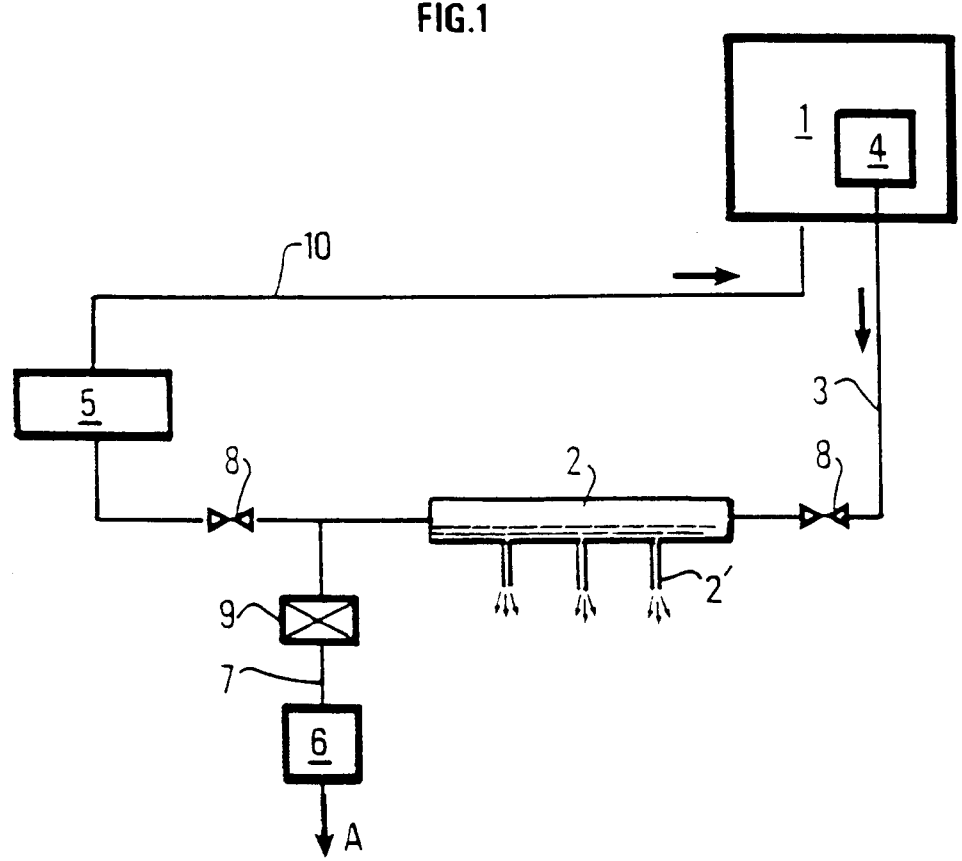
FIG. 1 is a diagram of a supply system according to an embodiment of the invention.

FIG. 1 shows a liquid fuel supply system according to a version of the invention. It essentially comprises a tank 1 that stores and maintains the fuel under pressure.

A line 3, also under pressure, starts from tank 1 and opens onto liquid fuel pressure injection means 2 that open either directly into combustion chambers or into the intake system of the engine.

A "common rail" type system can be used as injection means 2. This type of injector advantageously allows very precise fuel proportioning in time and in space. It comprises a series of injectors 2'. The flexibility of use is highly appreciated by motormen and it can be favourably integrated within the scope of the present invention.

The supply system further comprises a pump 4 placed either in tank 1 or on supply line 3. A pressure regulator 5 is also provided either in tank 1 (FIG. 2) or on line 3 (case of FIG. 2).

A by-pass line 7 is furthermore provided in branch connection with line 3 downstream from injection means 2 in relation to the direction of circulation of the fuel in line 3. By-pass line 7 opens onto intake system A of the engine.

A canister type means 6 intended for gaseous fluid storage is placed on line 7.

According to the embodiment of FIG. 1, a return line 10 connects injection means 2 and tank 1. Pressure regulator 5 can be arranged on this line 10.

According to the invention, means 8 intended to isolate injection means 2, 2' in relation to the supply circuit are provided.

According to FIG. 1, means 8 are placed on either side of injection means 2.

Figure 2:
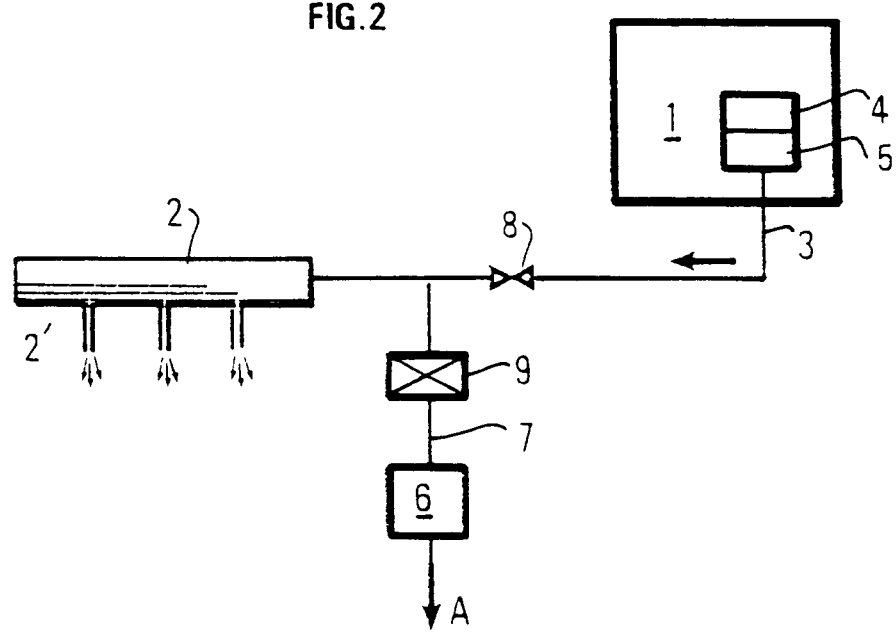
FIG. 2 is a diagram of a supply system according to another embodiment of the invention.

In accordance with FIG. 2, isolation means 8 are arranged on line 3 upstream from the branch connection of line 7.

Furthermore, according to the embodiment of FIG. 2, line 7 is branch connected upstream from injection means 2.

Means 8 can preferably consist of solenoid valves that can be controlled according to the engine stoppage conditions: duration, temperature, pressure.

Furthermore, a drain means 9 such as a solenoid valve is provided on by-pass line 7 just upstream from canister 6.

Thus, during prolonged stoppage of the engine, solenoid valves 8 are activated so as to isolate the part of the supply system comprising injectors 2'. Drain means 9 is thereafter activated so as to lower the pressure in the part of the system comprising injectors 2, 2' and by-pass 7. The fuel contained in this part of the supply system then changes from the liquid to the gaseous state.

Draining can thus be performed for the fuel towards canister 6. Emptying this "critical" zone of the supply system prevents fuel leakage into the engine. The canister can for example consist of activated charcoal allowing adsorption of the gaseous fuel.

The engine can thus be restarted after closing drain means 9 and reopening solenoid valves 8. This allows to overcome the drawbacks of the prior art. During restarting, the fuel trapped in canister 6 can be discharged to intake A and reused for combustion.

What is claimed is:

1. A system intended for pressure supply of liquid fuel to at least one combustion chamber of an inter-combustion engine, comprising a tank for pressure storage of liquid fuel, injection means for pressure injection of fuel into at least one combustion chamber, a line between said tank and said injection means, a pump placed in said tank or on said line, a pressure regulator placed in said tank or on said line, a gaseous fuel storage container placed on a by-pass of said line towards an intake system of the engine and intended for gaseous fuel storage, isolation means for isolating said injection means in relation to said tank, and means for draining said injection means, arranged on said by-pass, upstream from said gaseous fuel storage container.

2. A supply system as claimed in claim 1, characterized in that said injection means comprises at least one rail comprising each several injectors.

3. A supply system as claimed in claim 1, characterized in that said line comprises a fuel line and a return line provided on either side of said injection means between said injection means and said tank.

4. A system as claimed in claim 3, characterized in that said isolation means comprises at least two solenoid valves placed respectively of said fuel line and on said return line, on either side of said injection means.

5. A system as claimed in claim 1, characterized in that said isolation means comprises a solenoid valve arranged on said line between said tank and said by-pass.

6. A system as claimed in claim 1, further comprising control means for controlling said isolation means according to the engine stoppage time and conditions.

7. A system as claimed in claim 6, characterized in that the control means react to the pressure and/or to the surrounding temperature.

8. A system for pressure supply of liquid fuel to at least one combustion chamber of an internal-combustion engine, comprising;

a tank for pressure storage of liquid fuel;

at least one injector for injecting the liquid fuel into at least one combustion chamber of the engine;

a line connecting the tank to the at least one injector;

a pump for pumping the liquid fuel from the tank through at least a portion of the line to the at least one injector and into the at least one combustion chamber of the engine;

a by-pass line branched from the line connecting the tank to the at least one injector, and connecting the line to an intake system of the engine;

a gaseous fuel storage container fuel storage container provided on the by-pass line between the intake system of the engine and the line connecting the tank to the at least one injector;

at least one valve for isolating the at least one injector and the by-pass line from the tank; and a drain for draining fuel from the at least one injector when the at least one injector and the by-pass line are isolated from the tank by the at least one valve.

9. A system as claimed in claim 8, wherein the line connecting the tank to the at least one injector comprises a fuel line for supplying liquid fuel from the tank to the at least one injector and a return line for returning fuel from the at least one injector to the tank.

10. A system as claimed in claim 9, wherein said at least one valve comprises a first solenoid valve provided on the fuel line and a second solenoid valve provided on the return line.

11. A system as claimed in claim 10, wherein the drain comprises a solenoid valve provided on the by-pass line between the gaseous filel storage container and the line connecting the tank to the at least one injector.

12. A system as claimed in claim 9, wherein the by-pass line is branched from the return line.

13. A system as claimed in claim 8, wherein the drain comprises a solenoid valve provided on the by-pass line between the gaseous fuel storage container and the line connecting the tank to the at least one injector.

14. A system as claimed in claim 8, wherein the at least one valve comprises a solenoid valve provided on the line between the tank and the at least one injector.

* * * * *